C. JARNAGIN.

Improvement in Hay and Grain Racks for Wagons.

No. 133,035.   Patented Nov. 12, 1872.

UNITED STATES PATENT OFFICE.

CHESLEY JARNAGIN, OF BEAN'S STATION, TENNESSEE.

IMPROVEMENT IN HAY AND GRAIN RACKS FOR WAGONS.

Specification forming part of Letters Patent No. 133,035, dated November 12, 1872.

*To all whom it may concern:*

Be it known that I, CHESLEY JARNAGIN, of Bean's Station, in the county of Grainger and State of Tennessee, have invented an Improved Hay or Grain Rack, of which the following is a specification:

The invention consists in a lower frame for hay-racks which projects forward and rests upon a platform of running-gear. It also consists in a shield or fender by which all forward movement of load in going down hill, and all inconvenience from the same to driver, is entirely prevented. It also consists in a folding curtain fastened to said shield, and attached to an end-pivoted bow, to shelter the driver from the effects of the direct rays of the sun.

Figure 1:
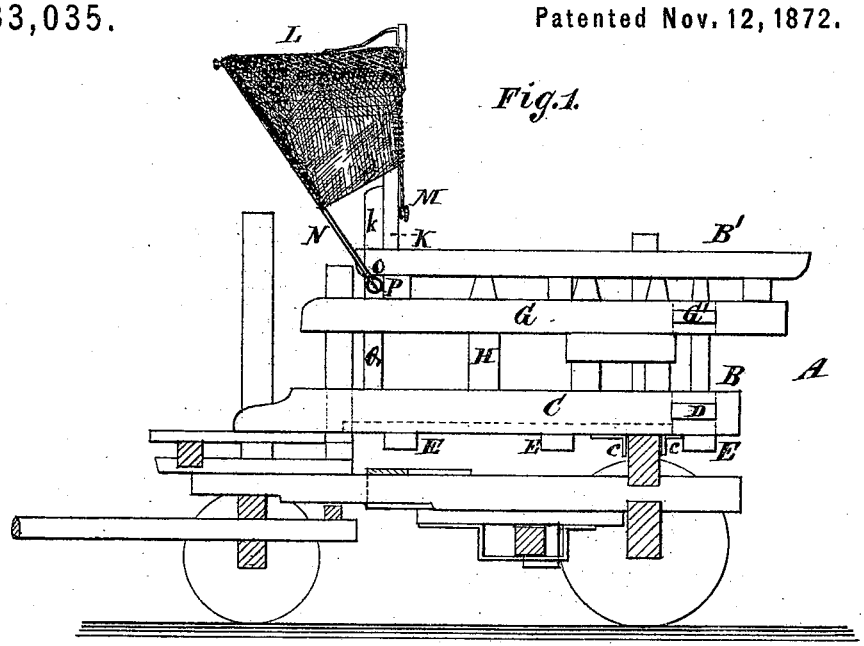
Figure 2:
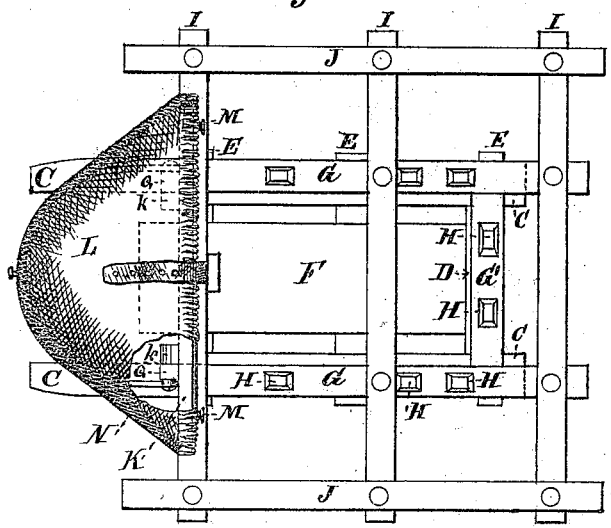

In the drawing, Figure 1 is a side elevation, and Fig. 2 is a top view.

A represents the hay and grain rack, composed of the lower frame B and upper extension frame B'. The lower frame B has two longitudinal timbers, C C, a rear cross-bar, D, and three cross-pieces, E E E, on which is laid the bottom F. These pieces C C have pendent stops $c$ $c$ which fit over rear axle of wagon, and forward projections that rest upon a platform in front of the ordinary running-gear of wagon. G G G' are three upper timbers, connected to the lower ones, C C and D, by the uprights H, which fit into mortises of said timbers. The extension frame B' is composed of three transverse timbers, I I I, and two longitudinal end bars, J J, while it rests midway upon the lower frame B, to which it is fastened in any suitable manner. K is a shield or fender attached rigidly and vertically on the front cross-timber I of extension frame B', and braced by bars $k$ $k$, which firmly fasten it to the lower frame B. The object of this shield is to protect the driver from the load in going down hill when the load, or a part thereof, often has a tendency to lurch forward. L is a curtain fastened by drawn cords to screws, pins, or studs M M on the inside of shield, and connected with the movable bow N on outside of shield. This bow is provided with sockets O O, having flat apertured shanks, which enable them to be pivoted to bolts P P upon standards Q Q. This bow is fastened back by flexible holders or straps, like carriage or buggy curtains. By this device the driver can protect himself from the direct rays of the sun in the middle of the day, and fold back the curtain in the morning or evening.

Having thus described my invention, what I claim as new, and desire to secure by Letters Patent, is—

1. The lower frame B of a hay-rack, provided with timbers C C that project in front, and with stops $c$ $c$ that fit over rear bolster of the wagon, as and for the purpose described.

2. The shield or fender K, arranged vertically in front of a hay-rack, as and for the purpose described.

3. The folding curtain combined with the shield, as and for the purpose described.

C. JARNAGIN.

Witnesses:
THOS. D. D. OURAND,
CHAS. A. PETTIT.